United States Patent [19]
Evans et al.

[11] Patent Number: 5,853,152
[45] Date of Patent: Dec. 29, 1998

[54] COLLECTIVE DETENT SYSTEM FOR VERTICAL TAKEOFF FLIGHT OPERATIONS

[75] Inventors: Charles W. Evans, Norfolk, Conn.; Jeffrey L. Cole, Stuart; Jefferson H. Slayden, Royal Palm Beach, both of Fla.

[73] Assignee: Sikorsky Aircraft Corporation, Stratford, Conn.

[21] Appl. No.: 841,096

[22] Filed: Apr. 29, 1997

[51] Int. Cl.$^6$ ........................................ B64C 13/14
[52] U.S. Cl. ...................... 244/221; 244/223; 244/224; 244/234
[58] Field of Search .................... 244/221, 223, 244/224, 236, 234, 178, 76 R, 196, 197

[56] References Cited

U.S. PATENT DOCUMENTS

| | | |
|---|---|---|
| 2,719,684 | 10/1955 | Peed . |
| 2,772,841 | 12/1956 | Bonsteel . |
| 2,801,060 | 7/1957 | Bonsteel et al. . |
| 2,843,344 | 7/1958 | Gibb . |
| 3,920,966 | 11/1975 | Knemeyer et al. . |
| 4,758,958 | 7/1988 | Von Gersdorff . |

OTHER PUBLICATIONS

Sikorsky S–76 Flight Manual, SA 4047–76C–10, FAA Approved 19 Jun. 1996, pp. 2–28 to –32;1–13; 1–59 to –60; 4–8 to –11.

*Primary Examiner*—Charles T. Jordan
*Assistant Examiner*—Tien Dinh
*Attorney, Agent, or Firm*—Terrance J. Radke

[57] ABSTRACT

A collective detent system is incorporated in combination with the flight control system of a helicopter to enhance vertical takeoff flight operations of the helicopter. One embodiment of the collective detent system includes a collective control stick that is pivotable through a range of operating positions from a full-down collective position to a full-up collective position with one of the operating positions of the range defining a vertical takeoff operating position that provides the vertical takeoff power level required for the vertical takeoff flight profile of the helicopter, a trim switch for a conventional collective trim system that is operative to implement a trim mode function wherein the collective control stick can be trimmed in any selected operating position, a vertical takeoff (VTO) detent switch that is operative to generate a detent signal when activated, an adjustable sensor that is operative to generate a stick-position signal when the collective control stick is pivoted into the vertical takeoff operating position, a restraint force generating (RFG) device, and a modified trim system circuit that functionally interconnects the trim switch, the VTO detent switch, the adjustable sensor, and the RFG device in interactive combination. Prior to pivoting the collective control stick into the vertical takeoff operating position, the VTO detent switch is activated to generate the detent signal. During the vertical takeoff profile, the adjustable sensor detects the pivotal movement of the collective control stick into the vertical takeoff operating positions and generates the stick-position detent signal in response thereto. The RFG device is automatically operative in response to the detent signal and the stick-position signal to generate a restraint force against the collective control stick to electromechanically "detain" the collective control stick in the vertical takeoff operating position and to impede manual movement of the collective control stick out of the vertical takeoff operating position.

8 Claims, 7 Drawing Sheets

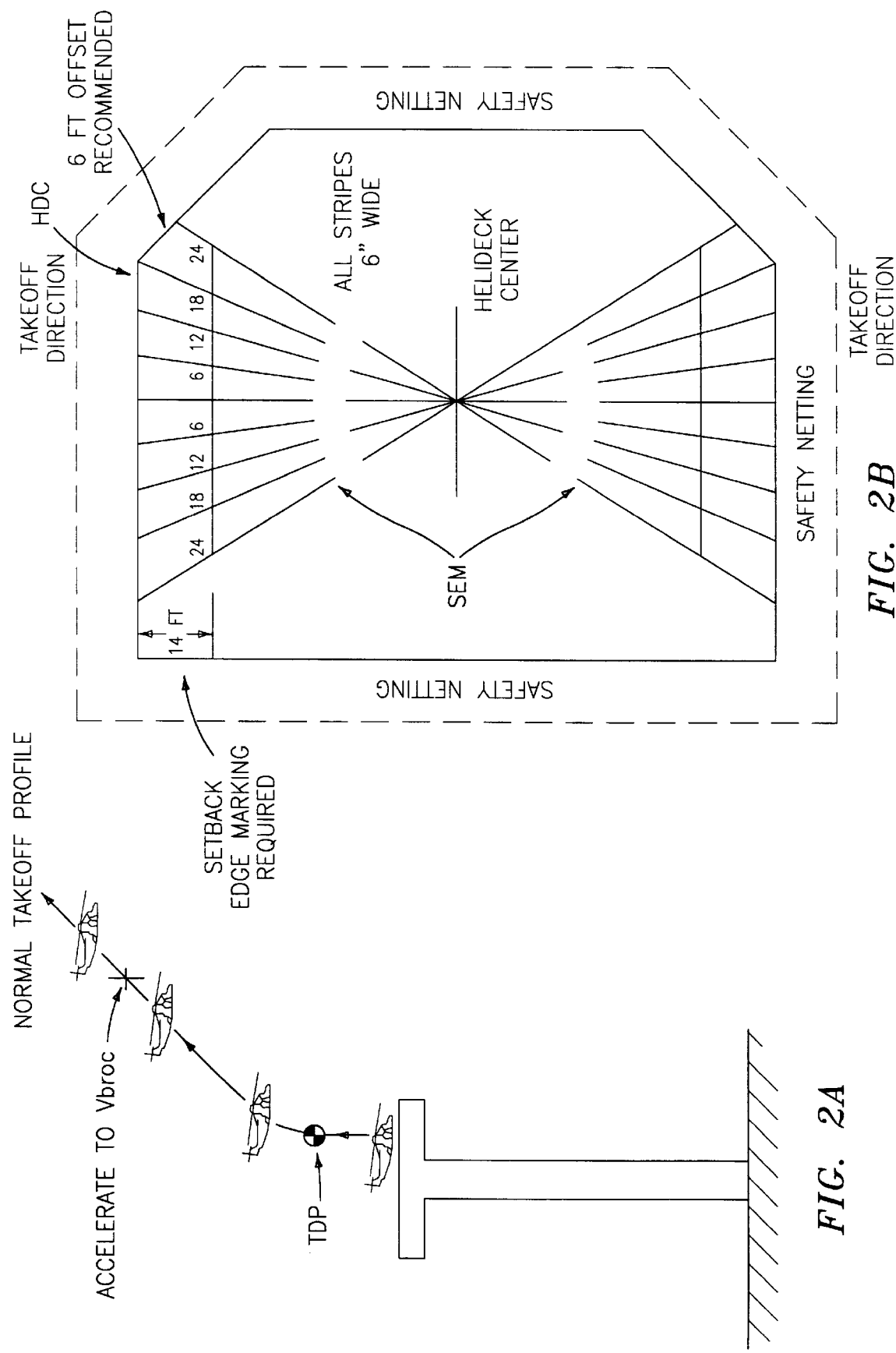

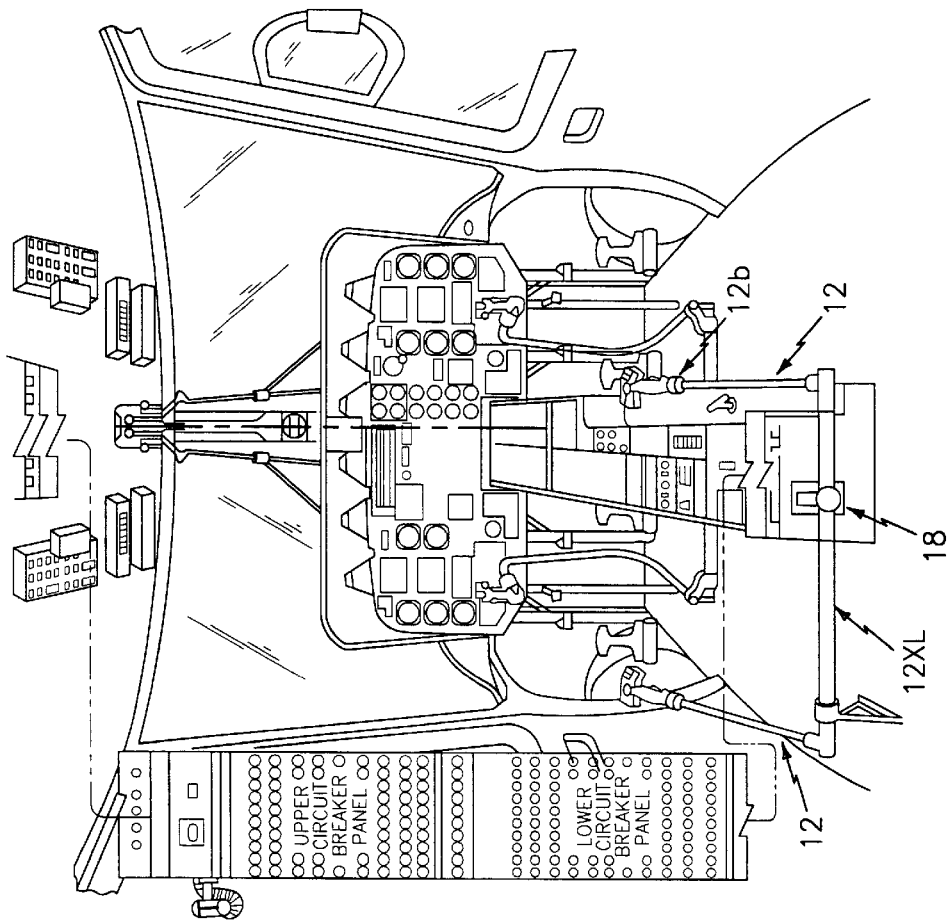
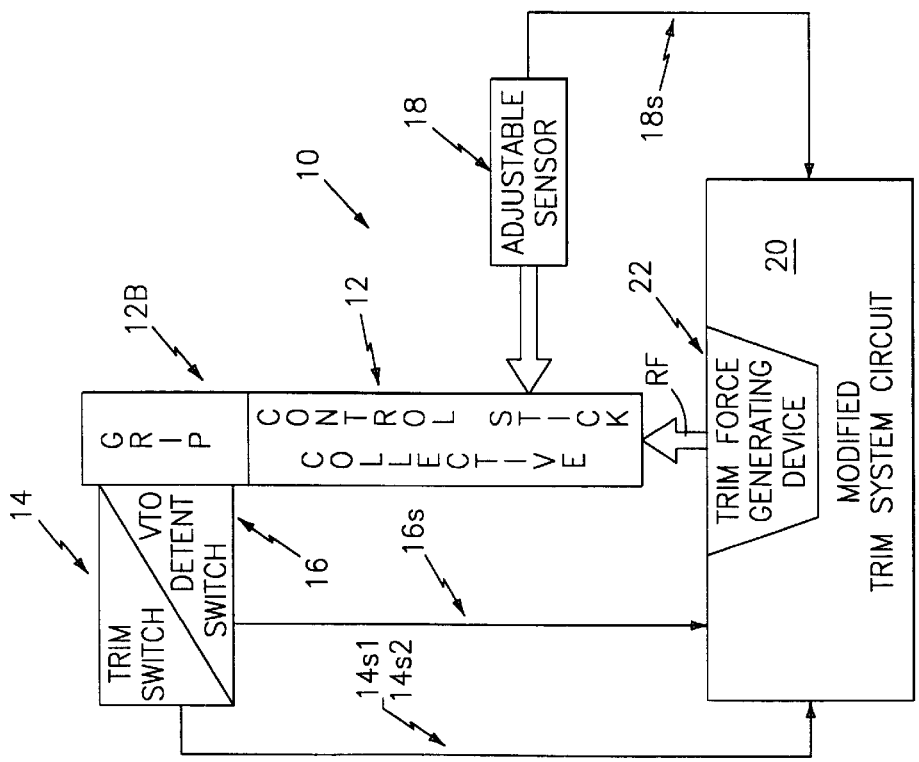
FIG. 5
FIG. 4

| TEMP ~C | PRESSURE ALTITUDE~FT | | | | | | | | | |
|---|---|---|---|---|---|---|---|---|---|---|
| | -1000 | | 0 | | 2000 | | 4000 | | 6000 | | 8000 | |
| | TARGET TAKEOFF Q~% | COLLECTIVE STICK POS ~% | TARGET TAKEOFF Q~% | COLLECTIVE STICK POS ~% | TARGET TAKEOFF Q~% | COLLECTIVE STICK POS ~% | TARGET TAKEOFF Q~% | COLLECTIVE STICK POS ~% | TARGET TAKEOFF Q~% | COLLECTIVE STICK POS ~% | TARGET TAKEOFF Q~% | COLLECTIVE STICK POS ~% |
| -40 | 100.0 | 46.2 | 100.0 | 47.0 | 100.0 | 48.6 | 100.0 | 50.4 | 100.0 | 52.4 | 94.6 | 52.9 |
| -35 | 100.0 | 46.7 | 100.0 | 47.5 | 100.0 | 49.1 | 100.0 | 51.0 | 100.0 | 52.9 | 92.5 | 52.9 |
| -30 | 100.0 | 47.1 | 100.0 | 47.9 | 100.0 | 49.6 | 100.0 | 51.5 | 98.1 | 53.0 | 90.5 | 52.9 |
| -25 | 100.0 | 47.6 | 100.0 | 48.4 | 100.0 | 50.1 | 100.0 | 52.0 | 95.8 | 52.9 | 88.3 | 52.7 |
| -20 | 100.0 | 48.0 | 100.0 | 48.9 | 100.0 | 50.6 | 100.0 | 52.6 | 93.5 | 52.8 | | |
| -15 | 100.0 | 48.5 | 100.0 | 49.3 | 100.0 | 51.1 | 99.0 | 52.8 | 91.3 | 52.7 | | |
| -10 | 100.0 | 48.9 | 100.0 | 49.8 | 100.0 | 51.6 | 96.6 | 52.7 | 89.2 | 52.5 | | |
| -5 | 100.0 | 49.4 | 100.0 | 50.2 | 100.0 | 52.1 | 94.6 | 52.6 | 87.3 | 52.5 | | |
| 0 | 100.0 | 49.8 | 100.0 | 50.7 | 98.0 | 52.6 | 92.5 | 52.5 | | | | |
| 5 | 100.0 | 50.3 | 100.0 | 51.2 | 95.9 | 52.6 | 90.6 | 52.4 | | | | |
| 10 | 100.0 | 50.7 | 100.0 | 51.6 | 93.4 | 52.5 | 88.6 | 52.3 | | | | |
| 15 | 100.0 | 51.2 | 100.0 | 52.1 | 90.9 | 52.2 | 86.3 | 52.1 | | | | |
| 20 | 100.0 | 51.6 | 100.0 | 52.1 | 87.9 | 52.0 | | | | | | |
| 25 | 98.7 | 51.7 | 98.3 | 51.7 | 84.9 | 51.5 | | | | | | |
| 30 | 95.5 | 51.3 | 95.2 | 51.2 | 81.1 | 51.1 | | | | | | |
| 35 | 91.5 | 50.6 | 92.0 | 50.6 | | 50.3 | | | | | | |
| 40 | 87.6 | 49.9 | 88.2 | 49.9 | | | | | | | | |

ABOVE 5000 FT DENSITY ALTITUDE

FIG. 7

FULL DOWN COLLECTIVE IS EQUIVALENT TO 0%
FULL UP COLLECTIVE IS EQUIVALENT TO 100%

COLLECTIVE DETENT SYSTEM FOR VERTICAL TAKEOFF FLIGHT OPERATIONS

TECHNICAL FIELD

The present invention relates to aircraft flight controls, and more particularly, to a collective detent system for a helicopter that enhances vertical takeoff flight operations.

BACKGROUND ART

The normal takeoff flight profile for helicopter operations is characterized by marked horizontal translational movement at a height relatively close to the ground. For example, a Category A normal takeoff flight profile (see FIG. 1A) involves increasing the collective setting to a power level sufficient to establish an above-ground hover, e.g., a height five to ten feet above the ground level (AGL), further increasing the collective setting to an operating position greater than the above-ground hover collective setting, e.g., a power level setting wherein engine torque is approximately 10% greater than the above-ground hover torque setting, and decreasing the helicopter pitch attitude to achieve level acceleration to a critical decision point (CDP), i.e., the CDP is a forward airspeed that is defined, inter alia, in terms of pressure altitude, temperature, and the helicopter takeoff gross weight—for example, for the SIKORSKY® S-76C+ helicopter the CDP is within the range of 30–49 knots indicated airspeed (KIAS), while maintaining horizontal translational movement at the AGL height. Once the CDP is achieved, the helicopter pitch attitude is adjusted to initiate a climb at $V_2$, i.e., $V_2$ is a forward airspeed that is defined as the CDP plus a fixed airspeed value—for example, for the SIKORSKY® S-76C+ helicopter $V_2$ is 10 KIAS greater than the CDP. Finally, with $V_2$ established in a positive rate-of-climb and the helicopter clear of obstacles, the collective setting is gradually increased to accelerate the helicopter to its best rate-of-climb airspeed, i.e., Vy in FIG. 1A.

A Category B normal takeoff flight profile (see FIG. 1B) is similar to the Category A normal takeoff profile described in the preceding paragraph except that a fixed airspeed, e.g., 50 KIAS for the SIKORSKY® S-76C+ helicopter, is the takeoff decision parameter in lieu of the variable CDP and a fixed rate-of-climb airspeed, e.g., 55 KIAS for the SIKORSKY® S-76C+ helicopter, is effected in lieu of $V_2$. As an examination of FIGS. 1A, 1B shows, a helicopter experiences marked horizontal translational movement at the AGL height during normal takeoff flight profiles, although less so for the Category B normal takeoff flight profile than the Category A normal takeoff flight profile. As a general rule, normal takeoff flight profiles as described hereinabove can be effected with lower takeoff power levels since such normal takeoff flight profiles benefit from both ground effect and translational lift, with the result that the helicopter engine system is subjected to less wear and tear.

One of the distinct advantages of a helicopter, however, is the capability to conduct vertical flights operations, particularly takeoffs and landings, in confined areas [confined being used herein in the sense that there are physical obstructions that limit horizontal translational movement of the helicopter at the AGL height] and/or constrained areas [constrained being used herein in the sense that there are regulatory limitations, e.g., FAA, CAA, JAR, imposed upon helicopter operations in such areas]. Representative examples of confined and/or constrained areas where vertical flight operations are advantageous but are governed by obstructions and/or regulations are ground-level heliports located within densely populated metropolitan areas, elevated heliports, e.g., building rooftops having helidecks, and marine oil rigs having helidecks.

Flight operations in such confined and/or constrained areas utilize a takeoff flight profile that is characterized primarily by vertical translational movement, i.e., horizontal translational movement is minimized. Such vertical takeoff flight profiles are more power intensive, i.e., higher takeoff power levels are required, than the normal takeoff flight profiles described in the preceding paragraphs. A Category A vertical takeoff flight profile is exemplarily illustrated in FIG. 2A with respect to an elevated helideck, and encompasses the following operational procedures.

First, the parking brake is set to preclude any inadvertent horizontal movement of the helicopter prior to liftoff. Next, the Takeoff Decision Point (TDP), i.e., a helicopter-specific altitude above the takeoff surface—for example, for the SIKORSKY® S-76C+ helicopter the TDP is an altitude of thirty (30) feet above the helideck surface, is set in the radar altimeter bug. The pilot then establishes a wheels light hover in the takeoff position by slightly increasing the collective setting (a wheels light hover is defined as a condition wherein most of the helicopter weight is removed from the landing gear and liftoff is impending, but horizontal translational movement of the helicopter along the helideck surface is precluded by the locked brakes). At this point in the vertical takeoff procedure, the setback edge markings of the helideck surface (see reference characters SEM in FIG. 2B) should pass through the pilot's seat, thereby providing a visual indication to the pilot that the helicopter is centered on the helideck surface. Prior to initiating liftoff, the pilot checks the cockpit instruments to ensure that relevant operating parameters, particularly engine system parameters, are within operating limits as specified in the helicopter flight manual.

To effect takeoff, the pilot rapidly increases the collective setting to the vertical takeoff power level. The vertical takeoff power level is a helicopter-specific variable that depends, inter alia, on parameters such pressure altitude, temperature, and helicopter gross weight. The operation of any specific helicopter is governed by the associated flight manual, which includes one or more graphs that allow the pilot to readily determine the appropriate vertical takeoff power level, as defined by such parameters, prior to initiating the vertical takeoff procedure. During the remainder of the vertical takeoff procedure, the pilot must continually monitor the various instruments and manually adjust the collective setting as required to ensure that the predetermined vertical takeoff power level is properly established and maintained (and not exceeded). Concomitantly, the pilot must ensure that the ascending flight path of the helicopter is a vertical flight profile and must input course corrections as required to maintain such vertical flight profile. Furthermore, the pilot must maintain a helicopter position using attitude so that at least one corner of the helideck (see, for example, reference characters "HDC" in FIG. 2B) is visible through the chin window or lower door window during ascent through the TDP to ensure that the pilot is cognizant of the location of the heliport should an emergency arise, e.g., loss of an engine which requires an emergency landing back onto the helideck.

The radar altimeter tone sounds (as a result of the radar altimeter bug setting described hereinabove) when the helicopter reaches the TDP during the vertical flight profile, thereby alerting the pilot regarding the altitude of the helicopter. At the TDP, the pilot manipulates the cyclic control system to rotate the helicopter to a specified nose-down pitch attitude in two (2) seconds or less. The nose-down pitch attitude is helicopter specific, and for the SIKORSKY® S-76C+ helicopter the nose-down pitch attitude is 22°±2°. Positioning the helicopter in the specified nose-down pitch attitude causes the helicopter flight profile to have a gradually increasing horizontal translational component in addition to the vertical translational component, i.e., the forward airspeed of the helicopter increases.

By definition, the cyclic input implemented by the pilot defines the TDP. If an emergency occurs prior to the TDP, i.e., before the cyclic input by the pilot, the vertical takeoff flight profile is aborted by the pilot in accordance with the appropriate emergency procedure in the helicopter flight manual. If an emergency occurs during or after the TDP, i.e., after the cyclic input by the pilot, a continued takeoff is mandatory using the appropriate emergency procedure as outlined in the helicopter flight manual.

For the Category A vertical takeoff flight profile, the pilot manipulates the cyclic control system to gradually decrease the nose-down pitch attitude of the helicopter with translational recovery as a result of increasing forward airspeed. The pilot continues such manipulation of the cyclic control system to establish an initial airspeed, i.e., the initial airspeed is a helicopter-specific characteristic—for the SIKORSKY® S-76C+ helicopter the initial airspeed is 55 KIAS. Once the initial airspeed is established, the pilot continues acceleration of the helicopter to establish the best rate-of-climb airspeed for the helicopter (see reference characters $V_{broc}$ in FIG. 2A), i.e., the best rate-of-climb airspeed is a helicopter-specific characteristic—for the SIKORSKY® S-76C+ helicopter, the best rate-of-climb airspeed is 74 KIAS, until the helicopter reaches its desired cruise altitude.

As may be gleaned from an examination of the operating procedures for the vertical takeoff flight profile described in the preceding paragraphs, a vertical takeoff flight profile is very workload intensive for the pilot, particularly from liftoff to the TDP. The pilot must manually adjust the collective setting to the appropriate vertical takeoff power level. As noted above, the vertical takeoff power level is a variable parameter, which is determined from one or more graphs in the helicopter flight manual, that depends, inter alia, on the pressure altitude, temperature, and helicopter gross weight and, as such, the appropriate collective setting (vertical takeoff operating position of the collective control stick) varies from vertical takeoff to vertical takeoff, i.e., there is no single established collective setting that is appropriate for all vertical takeoff flight operations. Therefore, the pilot must estimate the initial vertical takeoff operating position of the collective control stick, i.e., collective setting, necessary to achieve the appropriate vertical takeoff power level (as predetermined by using the relevant graph(s) in the helicopter flight manual) and pivot the collective control stick to such estimated vertical takeoff operating position, cross-check the appropriate cockpit instruments to determine the power level achieved by such initial pivotal movement of the collective control stick, and effect additional manual adjustments of the collective control stick while cross-checking the appropriate cockpit instruments, as required, until the collective setting is properly positioned to establish the predetermined vertical takeoff power level. In addition to the foregoing, the pilot must ensure that the ascending flight profile of the helicopter is vertical, and must further maintain visual observation of a corner of the helideck until the TDP is reached.

A need exists to provide a means for reducing pilot workload during vertical takeoff flight operations by providing the pilot with the capability to readily establish the predetermined vertical takeoff power level while visually monitoring the vertical ascent path of the helicopter and maintaining continued visual contact with one corner of the helideck. Such means should provide the capability for precision setting of the predetermined vertical takeoff power level with minimal pilot attentiveness to cockpit instrument indications and without requiring any further additional manual adjustments. Furthermore, such precision setting of the appropriate vertical takeoff power level should be repeatable for each vertical takeoff flight profile. The means should provide the pilot with a tactile perception that the predetermined vertical takeoff power level has been established during vertical takeoff flight profiles, and should be transparent to the pilot during all other helicopter flight operations unless specifically commanded by the pilot. The means should also provide the pilot with capability to reconfigure to any of the different vertical takeoff power levels required to accommodate the variability in takeoff power levels as a function of pressure altitude, temperature, and helicopter gross weight.

DISCLOSURE OF THE INVENTION

One object of the present invention is to provide a collective detent system that reduces pilot workload during a vertical takeoff flight profile by providing the pilot with the capability to readily establish the predetermined vertical takeoff power level, i.e., collective setting, defined for the vertical takeoff flight profile while visually monitoring the vertical ascent path of the helicopter and maintaining continued visual contact with one corner of the helideck.

Another object of the present invention is to provide a collective detent system that allows the pilot to precisely establish the predetermined vertical takeoff power level defined for the vertical takeoff flight profile with minimal pilot attentiveness to cockpit instrument indications and without requiring any further additional manual adjustments.

A further object of the present invention is to provide a collective detent system that provides repeatability in establishing the predetermined vertical takeoff power level during vertical takeoff flight operations.

Yet another object of the present invention is to provide a collective detent system that provides the pilot with a tactile perception that the predetermined vertical takeoff power level has been established during vertical takeoff flight profiles, and that is transparent to the pilot during all other helicopter flight operations unless specifically commanded by the pilot.

These and other objects of the present invention are provided by one embodiment of a collective detent system for the flight control system of a helicopter for use in helicopter flight operations, including a vertical takeoff flight profile according to the present invention that comprises a collective control stick that is pivotable through a range of operating positions from a full-down collective position to a full-up collective position and wherein one of the operating positions of the range is defined as a vertical takeoff operating position, a trim switch that is operative to generate a first trim signal when activated and a second trim signal when deactivated, a vertical takeoff detent switch that is operative to generate a detent signal when activated, a sensor that is operative to detect pivotal movement of the collective control stick into the vertical takeoff operating position and to generate a stick-position signal in response to detecting the collective control stick in the vertical takeoff operating position, and a restraint force generating device that is automatically energized in response to the detent signal and the stick-position signal to exert a restraint force on the collective control stick, de-energized in response to the first trim signal such that the restraint force is not exerted on the collective control stick such that the collective control stick is freely pivotable through the range of operating positions, and energized in response to the second trim signal to exert the restraint force on the collective control stick.

The vertical takeoff detent switch is activated prior to initiating the vertical takeoff flight profile in the helicopter to generate the detent signal. In the vertical takeoff flight profile, the sensor is operative to generate the stick-position signal when the collective control stick is pivoted into the vertical takeoff operating position wherein the restraint force generating device, in response to the detent signal and the stick-position signal, exerts the restraint force on the collective control stick to detain the collective control stick in the vertical takeoff operating position and to impede manual movement of the collective control stick out of the vertical takeoff operating position during the vertical takeoff flight profile of the helicopter.

During helicopter flight operations, the trim switch is activated to generate the first trim signal to de-energize the restraint force generating device so that the restraint force is not exerted on the collective control stick wherein the collective control stick is freely pivotable through the range of operating positions to a selected operating position. The trim switch is deactivated to generate the second trim signal to energize the restraint force generating device so that the restraint force is exerted on the collective control stick to detain the collective control stick in the selected operating position and to impede manual movement of the collective control stick out of the selected operating position during helicopter flight operations.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 2A is schematic view of a helicopter vertical takeoff flight profile mandated for takeoffs from elevated heliports.

FIG. 2B is a top plan view of an exemplary helideck landing pad illustrating the markings thereof.

FIG. 4 is a block diagram of one embodiment of a collective detent system according to the present invention.

FIG. 5 is a perspective view of the cockpit configuration of the SIKORSKY® S-76C+ helicopter of FIG. 3 illustrating several elements of the collective detent system according to the present invention.

FIG. 7 is an exemplary flight manual table illustrating predetermined vertical takeoff operating positions for the collective control stick correlated to vertical takeoff power levels (in terms of percent of engine torque) with respect to temperature and pressure altitude for a vertical takeoff flight profile.

BEST MODES FOR CARRYING OUT THE INVENTION

Figure 3:
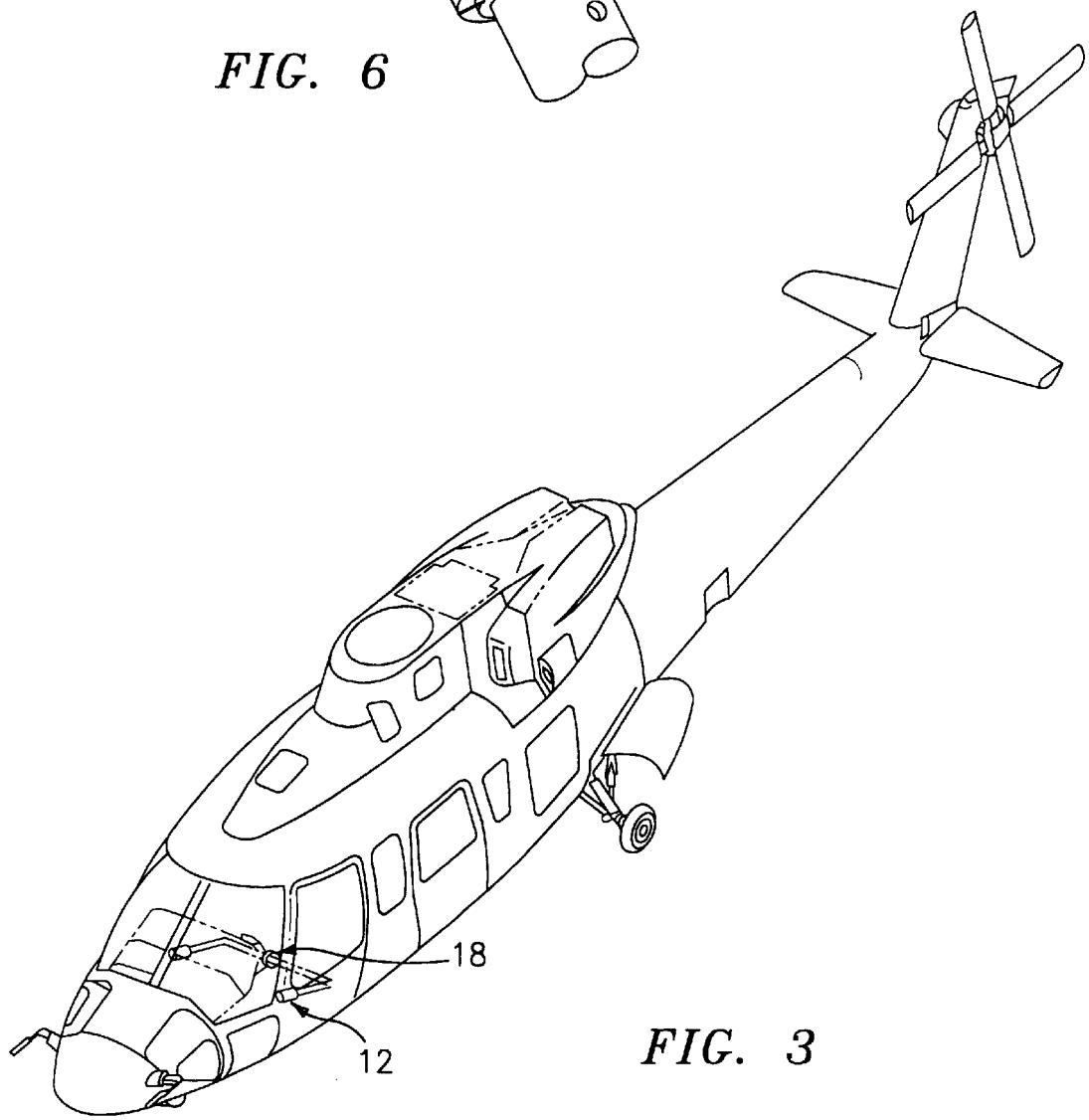
FIG. 3 is a perspective view of a SIKORSKY® S-76C+ helicopter (sans main rotor assembly).

Referring now to the drawings wherein like reference numerals identify corresponding or similar elements throughout the several views, FIG. 3 depicts a SIKORSKY® S-76C+ helicopter having a collective detent system according to the present invention integrated in combination with the helicopter flight control system. One skilled in the art will appreciate that, while the collective detent system is described herein in terms of the SIKORSKY® S-76C+ helicopter, the collective detent system of the present invention can be incorporated in combination with the flight control systems of other types of helicopters.

A conventional helicopter flight control system comprises a collective control system and a cyclic control system for varying the pitch angles of the main rotor blades to control the flight path of the helicopter in the vertical, pitch, and/or roll flight regimes. The flight control system may be either a single station system (pilot station only) or a dual station system (pilot and copilot stations). The collective detent system according to the present invention is integrated in combination with a conventional collective control system, and has utility in either single or dual station systems. The collective detent system exemplarily illustrated in FIG. 3 (and FIG. 5) is a dual station system, and the collective detent system of the present invention is described herein in terms of such a dual station system.

The collective control system includes a collective control stick that is configured for pivotal movement at one end thereof (see FIGS. 3, 5) wherein the collective control stick is pivotable through an operating range from full-down collective (0%) to full-up collective (100%). The collective control stick is manually pivoted by the pilot to implement control inputs (to establish a collective setting as described hereinabove) to all of the helicopter main rotor blades simultaneously, i.e., to simultaneously increase or decrease the pitch angles of all main rotor blades, for controlling the helicopter's flight path in the vertical flight regime. Collective control inputs are transmitted by mechanical linkage to a mixing unit which combines the collective control inputs with cyclic control inputs. The combined inputs are transmitted to the stationary ring of a swashplate by means of mechanical linkages and a two-stage hydraulic servo system. The combined inputs are coupled from the stationary ring to a swashplate rotating ring to vary the pitch of the main rotor blades.

The collective control system may include a collective trim system that is operative to trim, i.e., set and maintain, the collective control stick at any desired operating position (collective setting) within the operating range. A conventional collective trim system such as incorporated in the SIKORSKY® S-76C+ helicopter is an electrical system that includes an On/Off system switch (typically located on a helicopter console panel—see reference characters "SW" in FIGS. 8–9), a momentary trim release switch mounted on the grip of the collective control stick, and a trim system circuit that includes a trim force generating (TFG) device that is operative, when energized, to exert a trim force on the collective control stick to electro-mechanically "detain" the collective control stick in a specific operating position, i.e., collective setting, and to impede manual displacement of the collective control stick from such specific operating position. The system switch is operative (On position) to activate the trim system circuit so that the pilot can trim the collective control stick to any desired operating position during flight operations. The momentary trim release switch is operative to energize (or de-energize) the TFG device to exert (or terminate) the trim force. Conventional collective trim systems embody a conventional force generating device such as an electro-magnetic brake or a trim motor, gradient spring combination as the trim force generating (TFG) device that generates a trim force that is tactilely palpable to the pilot, and a conventional switching mechanism such as a single-pull trim release trigger as the momentary trim release switch.

With the system switch in the On position, the collective control stick is trimmed to a new operating position (collective setting) by depressing (pulling) the single-pull trim release trigger to de-energize the TFG device (thereby terminating any trim force being generated), manually pivoting the collective control stick to the new operating position, and releasing the single-pull trim release trigger to energize the TFG device. In the energized state, the trim force exerted by the TFG device on the collective control stick is of sufficient magnitude to electro-mechanically "detain" the collective control stick in the new operating position. The exerted trim force is also of sufficient magnitude to preclude the "positioned" collective control stick from being readily overridden, i.e., displaced manually, from the new operating position by the pilot, although the pilot can exert a manual displacement force of sufficient magnitude to override the exerted trim force wherein the collective control stick may be manually pivoted out of the current operating position to a different operating position should a flight exigency so dictate.

The exerted trim force provides a tactile indication or "feel" to the pilot when the collective control stick is in the new operating position, i.e., mechanically "detained", or when the pilot attempts to displace the collective control stick from the current operating position. With the collective trim system in the de-energized state (either by depressing the single-pull trim release trigger or positioning the system switch to the Off position), no trim force is exerted by the TFG device, and, as such, the collective control stick may be freely displaced within the operating range of the collective control stick by the pilot.

One embodiment of a collective detent system 10 according to the present invention is schematically illustrated in FIG. 4 and comprises a collective control stick 12, a trim switch 14, a vertical takeoff (VTO) detent switch 16, an adjustable stick-position sensor 18, and a modified trim system circuit 20 that includes a restraint force generating (RFG) device 22. The collective detent system 10 allows the pilot to readily establish the predetermined vertical takeoff power level for a vertical takeoff flight profile while visually monitoring the vertical ascent path of the helicopter and maintaining continued visual contact with the liftoff surface. The collective detent system 10 is operative to exert collective trim or detent, i.e., restraint, forces on the collective control stick 12 that are tactilely palpable to the pilot when operating in a trim mode or a vertical takeoff (VTO) mode, respectively, and the restraint force of the VTO mode is transparent or unobtrusive to the pilot during all other helicopter flight operations unless specifically commanded by the pilot. The collective restraint force exerted by the collective detent system 10 can be manually overridden by the pilot without excessive breakout or overshoot, i.e., manual displacement excursions within the operating range of the collective control stick 12 are controllable. The collective detent system 10 is operative in the VTO mode for precision setting (within±1%) of the collective control stick 12 to the vertical takeoff operating position, i.e., the predetermined vertical takeoff power level, with minimal pilot attentiveness to cockpit instrument indications and without requiring any further additional manual adjustments of the collective control system. The collective detent system 10 provides repeatability in vertical takeoff flight operations, i.e., the ability to readily establish the predetermined vertical takeoff power level each time the pilot implements a vertical takeoff flight profile. The collective detent system 10 is readily reconfigurable to define or identify different vertical takeoff operating positions for the collective control stick 12, i.e., different vertical takeoff power levels, to account for changes in ambient takeoff conditions or the configuration and/or loading of the helicopter.

The collective control stick 12 of the collective detent system 10 is structurally and functionally equivalent to the collective control stick described hereinabove. For the dual station configuration of the SIKORSKY® S-76C+ helicopter, the collective control stick 12 of the pilot (the collective control stick on the right in FIG. 5) is mechanically ganged to the copilot's collective control stick 12 by means of a cross-linkage 12XL such that manual adjustment (pivoting) of either the pilot's or the copilot's collective control stick 12 to a new operating position (collective setting) automatically results in a corresponding pivotal movement of the other collective control stick 12 to the same operating position (collective setting). The ensuing discussion is presented in terms of actions initiated by means of the pilot's collective control system for simplicity. One skilled in the art will understand that such discussion is equally relevant to actions initiated by means of the copilot's collective control system, and further, that any such actions affect both collective control systems.

Figure 8:
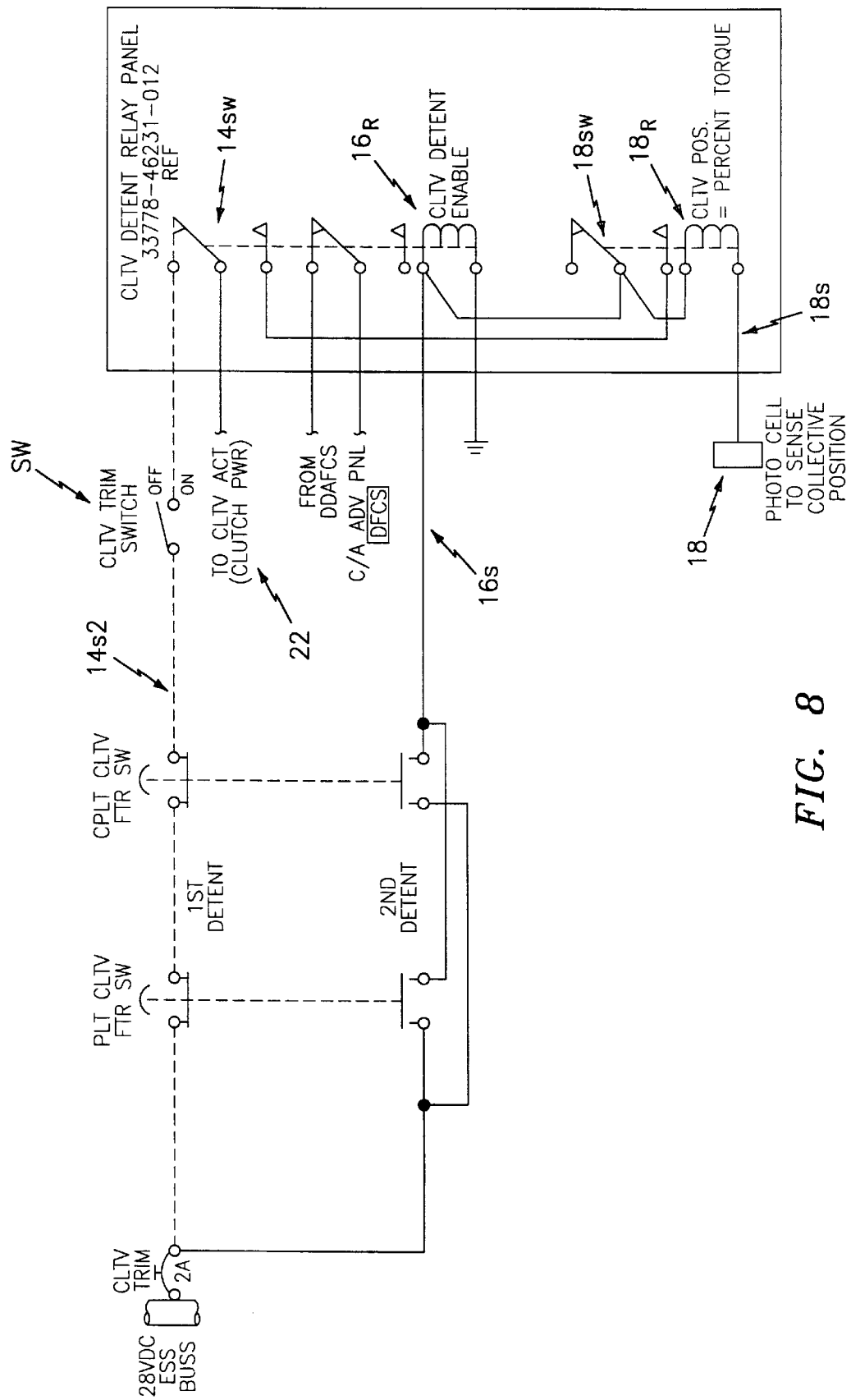
FIGS. 8–9 are circuit diagrams illustrating exemplary circuitry for collective trim and collective detent systems of the SIKORSKY® S-76C+ helicopter.

The trim switch 14 of the collective detent system 10 is similar in structure and function to the collective trim system described hereinabove, providing the pilot with the capability to implement the trim mode function, i.e., to establish and maintain the collective control stick 12 at any desired operating position (collective setting), by means of first and second trim signals 14s1, 14s2 (see FIG. 4) transmitted to the modified trim system circuit 20 to de-energize and energize the RFG device 22, respectively (for the described embodiment, the first trim signal 14s1 is an open circuit, i.e., no power to the RFG device 22—see FIG. 8).

The RFG device 22 is similar in structure and function to the TFG device described hereinabove, but has been redesignated as a restraint force generating device inasmuch as the force generated by the device is utilized in both the trim mode and the VTO mode. The RFG device 22 is operative, inter alia, for trimming the collective control stick 12 at any desired operating position (collective setting) as described hereinabove when the collective detent system 10 is operated in the trim mode.

Figure 1A:
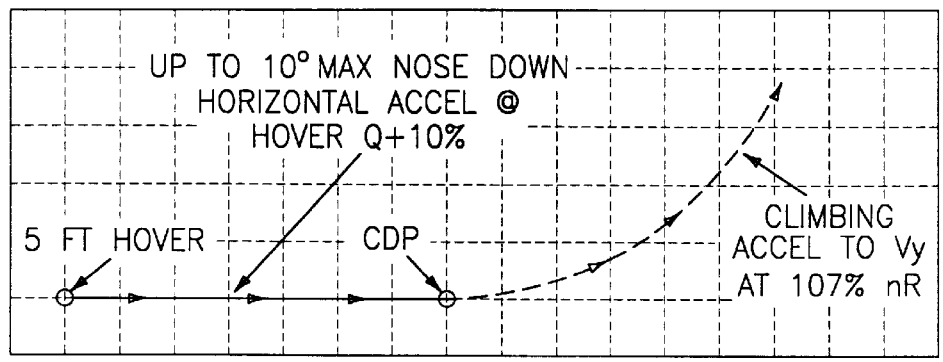
FIG. 1A illustrates a Category A normal takeoff flight profile for a helicopter.
Figure 1B:
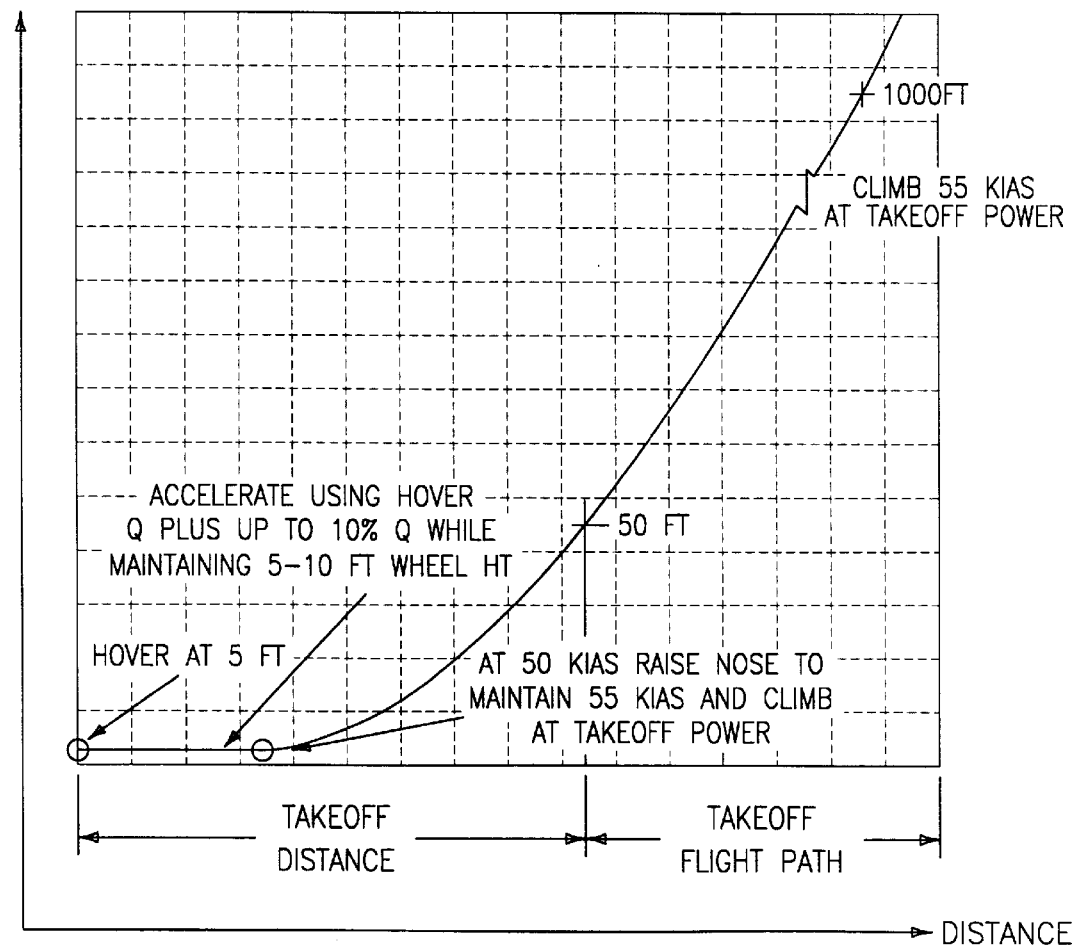
FIG. 1B illustrates a Category B normal takeoff flight profile for a helicopter.
Figure 6:
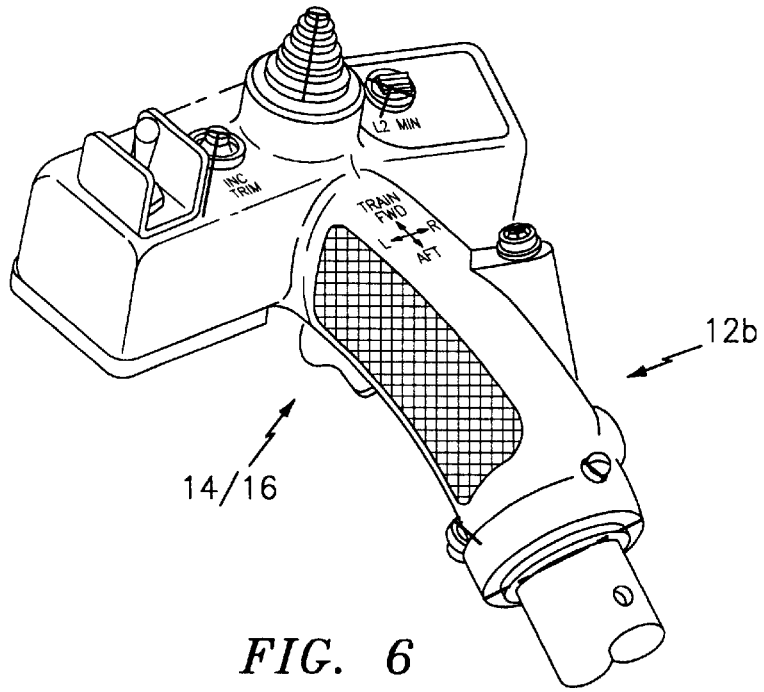
FIG. 6 is a perspective view of the collective control grip of the SIKORSKY® S-76C+ helicopter of FIG. 3 illustrating a double-pull release trigger for the described embodiment of the collective detent system of the present invention.

The VTO detent switch 16 is operative to automatically set the predetermined vertical takeoff power level for a vertical takeoff flight profile as described in further detail hereinbelow. For the embodiment of the collective detent system 10 for the SIKORSKY® S-76C+ helicopter described herein, the trim switch 14 and the VTO detent switch 16 are integrated into a single dual-function switching mechanism, e.g., a double-pull release trigger, for ergonometric considerations. To wit, the pilot is already familiar with the use of a trim switch in conjunction with the collective trim system. In addition, the force exerted by the RFG device 22, whether in trim mode or VTO mode, performs an identical function that is familiar to the pilot, i.e., electro-mechanically "detaining" the collective control stick 12 in a desired operating position (collective setting) and/or impeding the "positioned" collective control stick 12 from being readily overridden from the current operating position,. Finally, using a single switching mechanism in lieu of two separate switching mechanisms reduces the complexity of the grip 12b of the collective control stick 12 (see FIGS. 5,6). The double-pull release trigger 14/16 is mounted on the collective control grip 12b as exemplarily illustrated in FIG. 6.

The double-pull release trigger 14/16 is a dual-function trigger wherein a single click to a first position (from the released position) implements the trim mode function and a double click to a second position implements the VTO mode function. The force required to depress the double-pull release trigger 14/16 to the first position is palpably less than the force required to depress the double-pull release trigger 14/16 to the second position, thereby providing the pilot with tactile cognizance of which position the double-pull release trigger 14/16 is in. That is, as the double-pull release trigger 14/16 is depressed to the first position, a noticeable change in pull resistance is encountered by the pilot, and a palpable increase in depression force, i.e., with cognizance, must be exerted by the pilot to move the double-pull release trigger 14/16 into the second position.

In the first position, the double-pull release trigger 14/16 implements the trim mode function, i.e., operates in a manner that is functionally equivalent to the trim switch described hereinabove. That is, the double-pull release trigger 14/16 is depressed (pulled) to the first position to generate the first trim signal 14s1 to de-energize the modified trim system circuit 20 (thereby terminating any restraint force being generated by the RFG device 22), the pilot freely pivots the collective control stick 12 to the new operating position (collective setting) manually, and, once the new operating position is established, the pilot releases the double-pull release trigger 14/16 to the released position to generate the second trim signal 14s2 to activate the modified trim system circuit 20 to energize the RFG device 22. In the energized state, the RFG device 22 generates a restraint force RF (see FIG. 4) that electro-mechanically "detains" the collective control stick 12 in the new operating position (collective setting) and impedes the positioned collective control stick 12 from being readily manually overridden from such position.

For vertical takeoff flight operations, the pilot exerts sufficient pull on the double-pull release trigger 14/16 to displace the trigger through the first position and into the second position, i.e., initiates the VTO mode function. In the VTO mode, the double-pull release trigger 14/16 is operative to generate a detent signal 16s (see FIG. 4) that enables the modified trim system circuit 20 (with reference to FIG. 8, the detent signal 16s energizes the relay 16$_R$ to throw the switch 14$_{SW}$—with switch 14$_{SW}$ in the thrown position the RFG device 22 is de-energized). In the enabled state, the modified trim system circuit 20 is operative in response to a signal from the adjustable sensor 18 to automatically energize the RFG device 22 to exert the restraint force RF, as described in further detail hereinbelow.

The double-pull release trigger 14/16 is normally operative to activate the modified trim system circuit 20 to energize the RFG device 22 to exert the restraint force RF when the double-pull release trigger 14/16 is released from the trim mode (first position) to the released position. No restraint force RF is exerted when the double-pull release trigger 14/16 is depressed to the first or second position, which is the VTO mode. In consequence, the pilot is able to freely pivot the collective control stick 12 manually upwardly towards the vertical takeoff operating position that establishes the predetermined vertical takeoff power level.

When the helicopter is being operated with the collective trim system operative, i.e., the trim switch 14 is being utilized to implement the trim mode function, the vertical takeoff mode function is transparent or unobtrusive to the pilot. The vertical takeoff mode function is only implemented when the double-pull release trigger 14/16 is depressed to the second position. At all other times, the vertical takeoff mode function is transparent to the pilot and has no effect on the pivotal movement of the collective control stick 12 throughout the operating range thereof. If the vertical takeoff mode were not transparent to the pilot during helicopter flight operations other than vertical takeoff flight operations, i.e., when not commanded by the pilot, the unintentional exertion of the restraint force RF against the collective control stick 12 when the collective control stick 12 was pivoted into the vertical takeoff operating position could provide confusing and misleading information to the pilot.

The adjustable stick-position sensor 18, which is schematically illustrated in FIGS. 3–5 (see also FIGS. 8–9), is operative, when the collective detent system 10 is operating in the VTO mode, to detect the pivoting of the collective control stick 12 into the vertical takeoff operating position during a vertical takeoff flight profile and to generate a stick-position signal 18s (see FIG. 4) in response to such detection. The stick-position signal 18s is coupled to the modified trim system circuit 20 and activates the enabled modified trim system circuit 20 to automatically energize the RFG device 22 to exert the restraint force RF (see FIG. 4) (with reference to FIG. 8, the stick-position signal 18s energizes the relay 18$_R$ to throw the switch 18$_{SW}$—with switch 18$_{SW}$ in the thrown position, the signal 16s is transmitted through the thrown switch 14$_{SW}$ to energize the RFG device 22). The exerted restraint force RF electro-mechanically "detains" the collective control stick 12 in the vertical takeoff operating position (collective setting= predetermined vertical takeoff power level). In addition, the exerted restraint force RF impedes the "positioned" collective control stick 12 from being readily manually overridden from the vertical takeoff operating position, although the pilot can exert a manual displacement force of sufficient magnitude to override the restraint force RF if circumstances dictate.

The restraint force RF exerted by the RFG device 22 during the VTO mode function, i.e., in response to the stick-position signal 18s, is tactilely palpable to the pilot. As such, when the pilot manually pivots the collective control stick 12 into vertical takeoff operating position, the pilot is cognitively aware of the restraint force RF being exerted on the collective control stick 12. This cognitive awareness provides a cue to the pilot to cease manually pivoting the collective control stick 12, thereby leaving the collective control stick 12 in the vertical takeoff operating position.

The collective control stick 12 of the collective detent system 10 is pivotally adjustable through an operating range from a full-down collective position to a full-up collective position, with the vertical takeoff operating position falling within this operating range. The adjustable stick-position sensor 18 is operative to detect when the collective control stick 12 is manually pivoted into the vertical takeoff operating position by the pilot, and concomitantly, to generate the detent signal 18s when such detection occurs.

Figure 9:
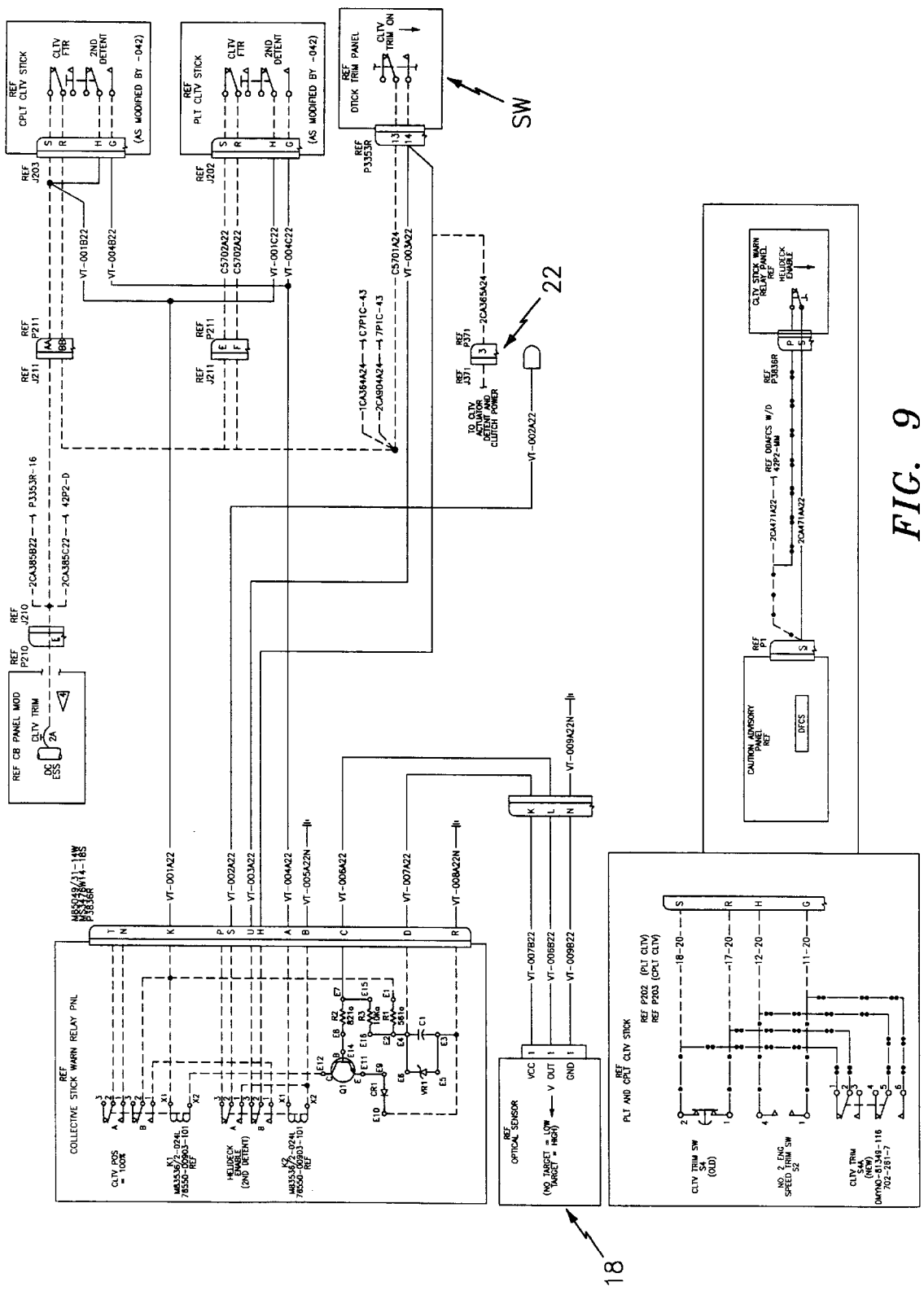

Sensors having the capability to detect when a pivoting object reaches a predetermined position are well known to those skilled in the art, and include transducers, potentiometers, optical sensors, proximity switches, etc. A collective control transducer or potentiometer, if already installed in the helicopter to satisfy the functional requirements of another feature or characteristic of the flight control system, can be adapted to function as the adjustable stick-position sensor 18 for the collective detent system 10 according to the present invention. Alternatively, the adjustable stick-position sensor 18 could be a dedicated sensor such as a transducer, a potentiometer, an optical sensor (an optical sensor is schematically illustrated in FIGS. 8–9), a proximity switch, a spring-actuated mechanical switch, or other types of sensors known to those skilled in the art.

In addition, the adjustable stick-position sensor 18 must be adjustable to accommodate a range of predetermined vertical takeoff operating position since the power level (collective setting) required for a vertical takeoff flight profile is a variable parameter that depends, inter alia, on pressure altitude, temperature, and helicopter gross weight. The determination of the necessary setting for the adjustable stick-position sensor 18 for operation thereof to detect pivotal movement of the collective control stick 12 into the predetermined vertical takeoff operating position is described in the following paragraphs.

FIG. 7 illustrates an exemplary flight manual table of predetermined vertical takeoff operating positions for the collective control stick 12 correlated to vertical takeoff power levels (expressed in terms of percent of engine torque) with respect to pressure altitude and temperature for a vertical takeoff flight profile for use in conjunction with the collective detent system 10 according to the present invention. While the table illustrated is that used in conjunction with the SIKORSKY® S-76C+ helicopter, one skilled in the art will appreciate that comparable tables can be readily developed for other types of helicopters.

Prior to initiating a vertical takeoff flight profile, the pilot references the table of FIG. 7 to determine the apposite vertical takeoff power level (in terms of percent of engine torque) and the correlated vertical takeoff operating position for the collective control stick 12 required for a vertical takeoff flight profile. Using the temperature and pressure altitude, which are known parameters, as entry points into the table of FIG. 7, the pilot determines the vertical takeoff power level ("Target Takeoff Q⁻%") and the correlated vertical takeoff operating position for the collective control stick 12 ("Collective Stick Pos⁻%") required for a vertical takeoff flight profile.

For the embodiment of the collective detent system 10 for the SIKORSKY® S-76C+ helicopter, the predetermined vertical takeoff operating position for the collective control stick 12 is referenced to the full-down position of the collective control stick 12, i.e., the predetermined vertical takeoff operating position is a percentage of the operating range of the collective control stick 12 based upon the full-down collective position as the baseline or zero percent. Prior to initiating the vertical takeoff flight procedure, therefore, the pilot reconfigures the adjustable sensor 18 (as required) to the determined percentage of the operating range of the collective control stick 12 as ascertained by means of the foregoing procedure.

The modified trim system circuit 20 for the collective detent system 10 functionally interconnects the trim switch 14, the VTO detent switch 16, the adjustable sensor 18, and the RFG device 22 in interactive combination. The modified trim system circuit 20 is operative, inter alia, to perform the trim functions described hereinabove, i.e., to implement the conventional trim mode function. In addition, the modified trim system circuit 20 includes additional circuitry that is operative to implement the VTO mode function. To wit, to: (i) enable the modified trim system circuit 20 in response to the detent signal 16s generated when the double-pull release trigger 14/16 is depressed to the second position; (ii) process the stick-position signal 18s generated by the adjustable stick-position sensor 18 as described hereinabove; and (iii) to automatically energize the RFG device 22 to exert the restraint force RF in response to the stick-position signal 18s.

A vertical takeoff flight procedure incorporating the collective detent system 10 according to the present invention comprises the following steps and operations. First, the pilot determines the apposite vertical takeoff power level and the correlated vertical takeoff operating position for the collective control stick 12 for a vertical takeoff flight profile utilizing the graph of FIG. 7. For example, for a temperature of 10° C. and a pressure altitude of 2,000 feet, the apposite vertical takeoff power level is 95.9% of engine torque and the correlated vertical takeoff operating position for the collective control stick 12 is 52.5% of the range of operating positions. Next the pilot reconfigures the adjustable sensor 18 as required so that the adjustable sensor 18 will be operative when the collective control stick 12 is manually pivoted from the full-down collective position to a position that corresponds to 52.5% of the operating range of the collective control stick 12, i.e., the predetermined vertical takeoff operating position.

Next, the pilot sets the parking brake, and then sets the TDP into the radar altimeter bug. The pilot then depresses the double-pull release trigger 14/16 to the second position to generate the detent signal 16s that enables the modified trim system circuit 20. The pilot then freely pivots the collective control stick 12 manually upwardly to establish a wheels-light hover, checks that the helicopter is properly positioned for a vertical takeoff flight profile by noting the position of the setback edge marks SEM with respect to the helicopter (if required), and scans the cockpit instruments.

To effect the vertical takeoff flight profile, the pilot freely pivots the collective control stick 12 manually upwardly towards the predetermined vertical takeoff operating position. The adjustable sensor 18 detects when the collective control stick 12 is pivoted into the predetermined vertical takeoff operating position and generates the stick-position signal 18s that is transmitted to the enabled modified trim system circuit 20. In the enabled state, the modified trim system circuit 20 is operative in response to the stick-position signal 18s to energize the RFG device 22 to exert the restraint force RF on the collective control stick 12.

The restraint force RF exerted on the collective control stick is readily palpable to the pilot, and when the pilot feels such restraint force RF, the pilot terminates upward pivoting movement of the collective control stick 12. When the pilot terminates upward pivoting movement of the collective control stick 12, the collective control stick 12 is electromechanically "detained" at the vertical takeoff operating position, e.g., the 52.5% position of the operating range of the collective control stick 12, and the predetermined vertical takeoff power level, e.g., 95.9% engine torque, is established. The pilot makes one quick visual scan of the cockpit instruments to confirm that the predetermined vertical takeoff power level has been established, e.g., 95.9% engine torque, and can then subsequently concentrate on maintaining the vertical ascent profile and maintaining visual contact with the helideck surface until the TDP is reached.

The pilot continues the vertical takeoff flight profile as described hereinabove. The pilot can release the double-pull release trigger 14/16 at any time during the vertical takeoff flight profile to the first position or the released position to engage the trim mode function. That is, partial release of the double-pull release trigger 14/16 to the first position causes the modified trim system circuit 20 to de-energize the RFG device 22, thereby allowing the pilot to freely pivot the collective control stick 12 out of the takeoff operating position. The double-pull release trigger 14/16 can subsequently be released from the first position to the released position to trim the collective control stick 12 in any operating position established by the pilot. Alternatively, full release of the double-pull release trigger 14/16 to the released position causes the modified trim system circuit 20 to energize the RFG device 22, thereby mechanically "detaining" the collective control stick 12 in any operating position selected by the pilot.

The embodiment of the collective detent system 10 according to the present invention described in the preceding paragraphs has the capability to implement both the trim mode function and the VTO mode function. One skilled in the art will appreciate the collective detent system of the present invention can be suitably modified to implement only the VTO mode function. That is, the collective detent system of the present invention can be configured to implement only the VTO mode, i.e., no trim mode. This embodiment would have utility in those helicopters wherein the helicopter flight control system does not include a collective trim system.

A variety of modifications and variations of the present invention are possible in light of the above-teachings. It is therefore to be understood that, within the scope of the appended claims, the present invention may be practiced otherwise than as specifically described hereinabove.

What is claimed is:

1. A collective detent system for a flight control system of a helicopter for use during a vertical takeoff flight profile, comprising:

a collective control stick that is pivotable through a range of operating positions from a full-down collective position to a full-up collective position, one of said operating positions of said range being defined as a vertical takeoff operating position for the vertical takeoff flight profile of the helicopter;

a vertical takeoff detent switch that is operative to generate a detent signal when activated;

a sensor that is operative to detect pivotal movement of said collective control stick into said vertical takeoff operating position and to generate a stick-position signal in response to detecting said collective control stick in said vertical takeoff operating position; and a restraint force generating device that is automatically energized in response to said detent signal and said stick-position signal to exert a restraint force on said collective control stick; and wherein said vertical takeoff detent switch is activated prior to initiating the vertical takeoff flight profile in the helicopter to generate said detent signal;

said sensor generates said stick-position signal when said collective control stick is pivoted into said vertical takeoff operating position;

said restraint force generating device, in response to said detent signal and said stick-position signal, exerts said restraint force on said collective control stick to detain said collective control stick in said vertical takeoff operating position and to impede movement of said collective control stick out of said vertical takeoff operating position during the vertical takeoff flight profile of the helicopter.

2. The collective detent system of claim 1 wherein said sensor is an adjustable sensor wherein said adjustable sensor can be reconfigured so that a different one of said operating positions of said range is defined as said vertical takeoff operating position for the vertical takeoff flight profile of the helicopter.

3. The collective detent system of claim 1 further comprising a trim switch that is operative to generate a first trim signal when activated and operative to generate a second trim signal when deactivated; and wherein said restraint force generating device is de-energized in response to said first trim signal such that said restraint force is not exerted on said collective control stick wherein said collective control stick is freely pivotable through said range of operating positions to a selected operating position; and wherein said restraint force generating device is energized in response to said second trim signal to exert said restraint force on said collective control stick to detain said collective control stick in said selected operating position and to impede movement of said collective control stick out of said selected operating position.

4. A collective detent system for a flight control system of a helicopter for use in helicopter flight operations, including a vertical takeoff flight profile, comprising:

a collective control stick that is pivotable through a range of operating positions from a full-down collective position to a full-up collective position, one of said operating positions of said range being defined as a vertical takeoff operating position for the vertical takeoff flight profile of the helicopter;

a trim switch that is operative to generate a first trim signal when activated and a second trim signal when deactivated;

a vertical takeoff detent switch that is operative to generate a detent signal when activated;

a sensor that is operative to detect pivotal movement of said collective control stick into said vertical takeoff operating position and to generate a stick-position signal in response to detecting said collective control stick in said vertical takeoff operating position; and a restraint force generating device that is automatically energized in response to said detent signal and said stick-position signal to exert a restraint force on said collective control stick, de-energized in response to said first trim signal such that said restraint force is not exerted on said collective control stick such that said collective control stick is freely pivotable through said range of operating positions, and energized in response to said second trim signal to exert said restraint force on said collective control stick; and wherein said vertical takeoff detent switch is activated prior to initiating the vertical takeoff flight profile in the helicopter to generate said detent signal;

said sensor generates said stick-position signal when said collective control stick is pivoted into said vertical takeoff operating position; and said restraint force generating device, in response to said detent signal and said stick-position signal, exerts said restraint force on said collective control stick to detain said collective control stick in said takeoff operating position and to impede movement of said collective control stick out of said vertical takeoff operating position during the vertical takeoff flight profile of the helicopter; and wherein said trim switch is activated to generate said first trim signal to de-energize said restraint force generating device so that said restraint force is not exerted on said collective control stick wherein said collective control stick is freely pivotable through said range of operating positions to a selected operating position during helicopter flight operations; and wherein said trim switch is deactivated to generate said second trim signal to energize said restraint force generating device so that said restraint force is exerted on said collective control stick to detain said collective control stick in said selected operating position and to impede movement of said collective control stick out of said selected operating position during helicopter flight operations.

5. The collective detent system of claim 4 wherein said sensor is an adjustable sensor wherein said adjustable sensor can be reconfigured so that a different one of said operating positions of said range is defined as said vertical takeoff operating position for the vertical takeoff flight profile of the helicopter.

6. The collective detent system of claim 4 wherein said trim switch and said vertical takeoff detent switch are integrated in combination in a single double-function switching mechanism.

7. The collective detent system of claim 6 wherein said single double-function switching mechanism is a double-pull release trigger.

8. A method for effecting a vertical takeoff flight profile in a helicopter, comprising the steps of:

(a) providing a collective detent system integrated in combination with a helicopter flight control system, said collective detent system including a collective control stick that is pivotable through a range of operating positions from a full-down collective position to a full-up collective position with one of said operating positions defining a vertical takeoff operating position that provides the vertical takeoff power level required for the vertical takeoff flight profile of the helicopter, a vertical takeoff detent switch that is operative to generate a detent signal when activated, a sensor that is operative to generate a stick-position signal when said collective control stick is pivoted into said vertical takeoff operating position, a restraint force generating device that is operative in response to said detent signal and said stick-position signal to automatically exert a restraint force against said collective control stick, and a modified trim system circuit that functionally interconnects said vertical takeoff detent switch, said sensor, and said restraint force generating device in interactive combination;

(b) activating said vertical takeoff detent switch to generate said detent signal prior to pivoting said collective control stick into said vertical takeoff operating position;

(c) detecting the pivotal movement of said collective control stick into said vertical takeoff operating position and generating said stick-position signal in response to said detection; and (d) automatically exerting said restraint force against said collective control stick to electro-mechanically "detain" said collective control stick in said vertical takeoff operating position and to impede manual movement of said collective control stick out of said vertical takeoff operating position.

* * * * *